United States Patent [19]

Dijk et al.

[11] Patent Number: 5,585,678
[45] Date of Patent: Dec. 17, 1996

[54] DEVICE AND PROCESS FOR MONITORING A SWITCH POSITION

[75] Inventors: Ron Dijk, Baden; Markus Meng, Unterehrendingen, both of Switzerland

[73] Assignee: ABB Management AG, Baden, Switzerland

[21] Appl. No.: 224,875

[22] Filed: Apr. 8, 1994

[30] Foreign Application Priority Data

Jun. 1, 1993 [DE] Germany .......................... 43 18 189.9

[51] Int. Cl.⁶ .................................................. G08B 21/00
[52] U.S. Cl. .......................... 307/112; 324/415; 340/644
[58] Field of Search .................................. 307/112, 113, 307/125; 340/635, 644, 653, 825.06, 825.18; 324/415, 416, 417, 418, 419, 420, 421, 422, 423, 424

[56] References Cited

U.S. PATENT DOCUMENTS

| | | | |
|---|---|---|---|
| 4,864,285 | 9/1989 | Rodden | 340/644 |
| 5,065,101 | 11/1991 | Ledbetter | 324/418 |
| 5,086,294 | 2/1992 | Kasegi | 340/644 |
| 5,136,280 | 8/1992 | Heggli | 340/644 |
| 5,202,589 | 4/1993 | Hiiser | 340/644 |
| 5,338,467 | 2/1995 | Jereb et al. | 73/862.381 |
| 5,422,564 | 6/1995 | Earle et al. | 324/67 |

FOREIGN PATENT DOCUMENTS

| | | |
|---|---|---|
| 160235 | 4/1985 | European Pat. Off. . |
| 1810707 | 1/1981 | Germany . |
| 3001940 | 1/1983 | Germany . |
| 3312153 | 10/1984 | Germany . |
| 500565 | 4/1976 | U.S.S.R. . |
| 758388 | 8/1980 | U.S.S.R. . |

*Primary Examiner*—William M. Shoop, Jr.
*Assistant Examiner*—Jonathan Kaplan
*Attorney, Agent, or Firm*—Oblon, Spivak, McClelland, Maier & Neustadt, P.C.

[57] ABSTRACT

A device for monitoring the switch position of a switch including an auxiliary voltage source, which is connected to the switch, a device for converting the switch position into an electrical signal, a device for transmitting the electrical signal and a device for evaluating the transmitted information. The converting device uses a pulse-duration modulation, the duty cycle of which becomes higher as the voltage $U_0$ of the auxiliary voltage source becomes smaller. This enables the monitoring device to be used for different auxiliary voltages, without any need for adaptation.

22 Claims, 2 Drawing Sheets

DEVICE AND PROCESS FOR MONITORING A SWITCH POSITION

BACKGROUND OF THE INVENTION

1. Field of the invention

The invention relates to the field of protection technology and station management technology.

It proceeds from a device for monitoring the switch position of a switch. It further relates to a process for monitoring a switch position.

2. Discussion of Background

Devices for monitoring a switch position are used, for example, for high-voltage and medium-voltage switching systems. The high-voltage switch must be monitored and exhibits, for this purpose, a series of auxiliary switches which are mechanically coupled to the high-voltage switch. The auxiliary switches are connected to an auxiliary voltage source. The auxiliary voltage source is preferably designed as a low voltage source. On account of the mechanical coupling, it is possible to infer directly the switch position of the high voltage switch from the switch position of the auxiliary switch. This brings with it the great advantage that it is not necessary to handle any high voltages for the detection of the switch position.

However, the auxiliary voltage sources are different from system to system, so that a specific monitoring device must be produced for each system.

Similar problems to those in the case of switch monitoring occur in the case of a monitoring device which is described in EP-B1-0 160 235. The invention according to this publication achieves the object of monitoring the trip circuit of a power switch for interruption of the supply lines and for short circuiting of the trip coil, without a specifically associated power supply being necessary for the monitoring device. In this case, the trip circuit is to be connectable to differing supply voltages.

Accordingly, the trip voltage of the system is expediently used for the power supply to the monitoring device. The current takeup of the monitoring device is constant, so that the adaptation to differing trip voltages is possible by means of series resistors. On this basis, it is indeed no longer necessary to design a specific circuit for each system, but the circuits must always still be adapted subsequently to the auxiliary voltage sources.

For the automated production of such circuits, it would however be desirable if the circuits did not have to be adapted once again. Furthermore, it would be desirable if not only the binary information "open/closed" but also the magnitude of the auxiliary voltage could be detected and transmitted.

SUMMARY OF THE INVENTION

Accordingly, one object of the invention is to provide a novel device for monitoring the switch position of a switch, which device is suitable for any auxiliary voltage source without having further to be specifically adapted. Furthermore, the intention is also to be able to detect the magnitude of the auxiliary voltage.

A further object is to provide a process for converting the switch position into the electrical signal.

Accordingly, the core of the invention is that the auxiliary voltage Uo is converted, when the switch is closed, into a pulse-duration-modulated pulse sequence, the duty cycle of which decreases as the auxiliary voltage increases. In other words, the smaller the auxiliary voltage Uo, the greater the duty cycle.

In a preferred embodiment, the first means comprise an adaptation network and a signal converter. The conversion of the voltage Uo into a pulse-duration-modulated signal takes place by means of an A/D converter and a pulse-duration modulator. Preferably, the signal from the second means is transmitted by means of an optocoupler to a secondary side.

The process according to the invention is distinguished in that in a first step the auxiliary voltage is converted into a digital signal and this digital signal is subsequently periodically transformed into a pulse-duration-modulated pulse sequence, the duty cycle of the pulse sequence becoming smaller as the auxiliary voltage increases.

The interrelationship between the duty cycle of the pulse sequence and the magnitude of the auxiliary voltage becomes especially simple if the duty cycle decreases linearly as the auxiliary voltage increases.

Further embodiments are evident from the subclaims.

The great advantage of the invention resides in that the same circuit can be used for any auxiliary voltage source. Not even a tuning of the monitoring units by means of series resistors is necessary any longer. Accordingly, the production of the monitoring units can be automated in a simple manner. This fact is directly reflected in an economic production price and in increased reliability. Over and above this, it is possible to infer directly the magnitude of the auxiliary voltage from the duty cycle of the pulse-duration-modulated signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The reference symbols used in the drawings and their meaning are listed in summary form in the list of designations. In principle, identical parts are provided with identical reference symbols in the figures.

DESCRIPTION OF THE PREFERRED EMBODIMENTS

Figure 1:
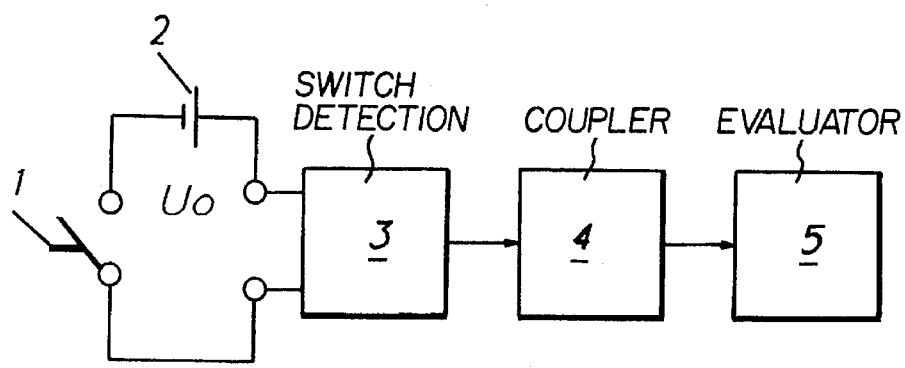
FIG. 1 shows a block diagram of a monitoring device according to the invention.

FIG. 1 shows a block diagram of a monitoring device according to the invention. A switch is designated by (1). This may be for example an auxiliary switch of a high voltage switch. This auxiliary voltage switch is mechanically coupled to the high voltage switch, so that it is possible to infer the position of the high voltage switch in a simple way from the position of the auxiliary switch. Such auxiliary switches are of great importance, and in any event they permit the monitoring of a high voltage switch at a low power level.

For the monitoring of the switch position of the switch (1), the latter is connected to an auxiliary voltage source (2), which emits a voltage Uo when the switch is closed. First means (3) are connected to the switch (1) and the auxiliary voltage source (2). These first means (3) detect the switch position of the switch (1) and convert the inherent binary information into an electrical signal.

This electrical signal is transmitted by the second means (4) to a preferably galvanically separated secondary side. The transmitted electrical signal is evaluated on this secondary side. The transmission preferably takes place by means of optocouplers. Other galvanically separated types of transmission are, however, also feasible.

Since however switching systems exhibit differing auxiliary voltages from one case to another, the monitoring devices must be adapted to the existing auxiliary voltage manually and in situ. Otherwise, differing drive currents of the optocoupler would result for differing voltages. In order that this should not be the case, the circuits in the prior art are adapted, such as for example in the initially mentioned publication, by means of series resistors.

Such an adaptation is however firstly time-consuming and secondly prevents an automated production of standardized monitoring devices. The monitoring device according to the invention is now intended to permit a single type of circuit to be capable of being used for differing auxiliary voltages, without any need to adapt further this type of circuit.

This is achieved in that the auxiliary voltage, which is present at the input of the first means (3) when the switch is closed, is converted into a pulse-duration-modulated pulse sequence, the duty cycle of which decreases as the auxiliary voltage increases. As a result of this, it is guaranteed that the transmission means (4) are driven with a power which is substantially independent of the auxiliary voltage.

An adaptation of the circuit to the auxiliary voltage source is thus entirely dispensed with.

As a further advantage, the encoding of the auxiliary voltage into a pulse-duration modulation can be cancelled, i.e. decoded, in the evaluating means (5). This gives not only an auxiliary-voltage-independent transmission of the switch position of the switch (2), but at the same time also information on the magnitude of the auxiliary voltage.

Usually, auxiliary voltages of 24 V to 250 V are used. In the worst case, this voltage exhibits a tolerance of ±25%, so that voltages of 18 V to 312 V must be expected.

Figure 2:
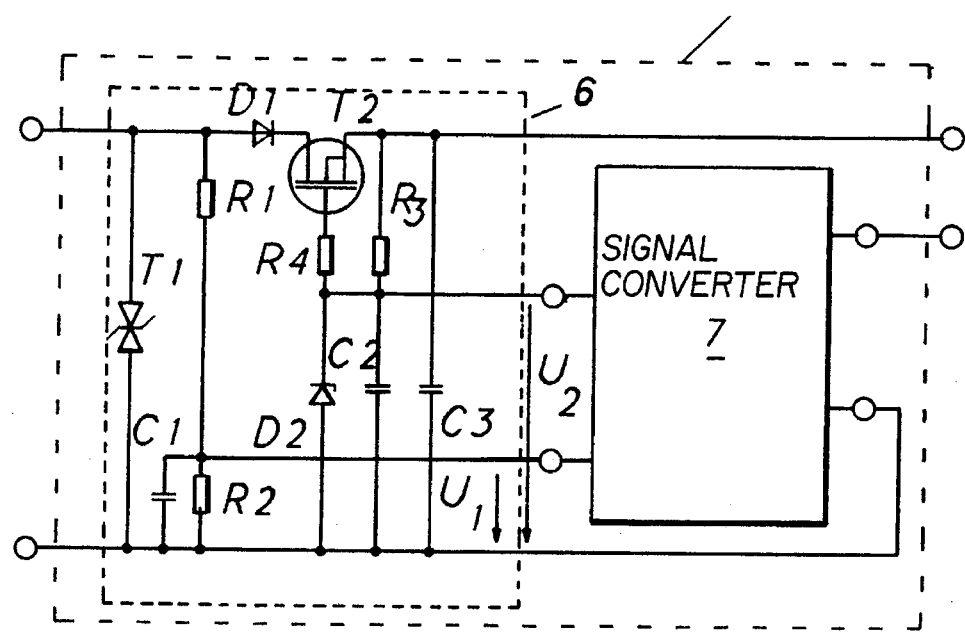
FIG. 2 shows a circuit arrangement of an embodiment of the first means.

FIG. 2 shows an embodiment of the detection and conversion means (3). These first means (3) are constructed from an adaptation network (6) and a signal converter (7).

The adaptation network (6) essentially comprises a voltage limiter (T1), a voltage divider (R1, R2, C1) and a diode (D1). The voltage limiter protects the monitoring arrangement from overvoltage, in that it limits the voltage present at its input to for example ±450 V.

In the normal case, the auxiliary voltage Uo is present when the switch is closed. This auxiliary voltage is divided in the voltage divider (R1, R2, C1) by a factor determined by the magnitude of the resistors (R1, R2). The capacitor (C1) serves for voltage smoothing. This divided voltage is passed on to the signal converter.

In addition, the auxiliary voltage is connected via a rectifier diode (D1) to a transistor (T2)—preferably a field effect transistor. This transistor acts together with the resistor (R3) as current source. This current flows through the Zener diode (D2). This gives a constant voltage which is smoothed by means of the capacitor (C2) and serves as a stable voltage supply for the signal converter (7).

Figure 4:
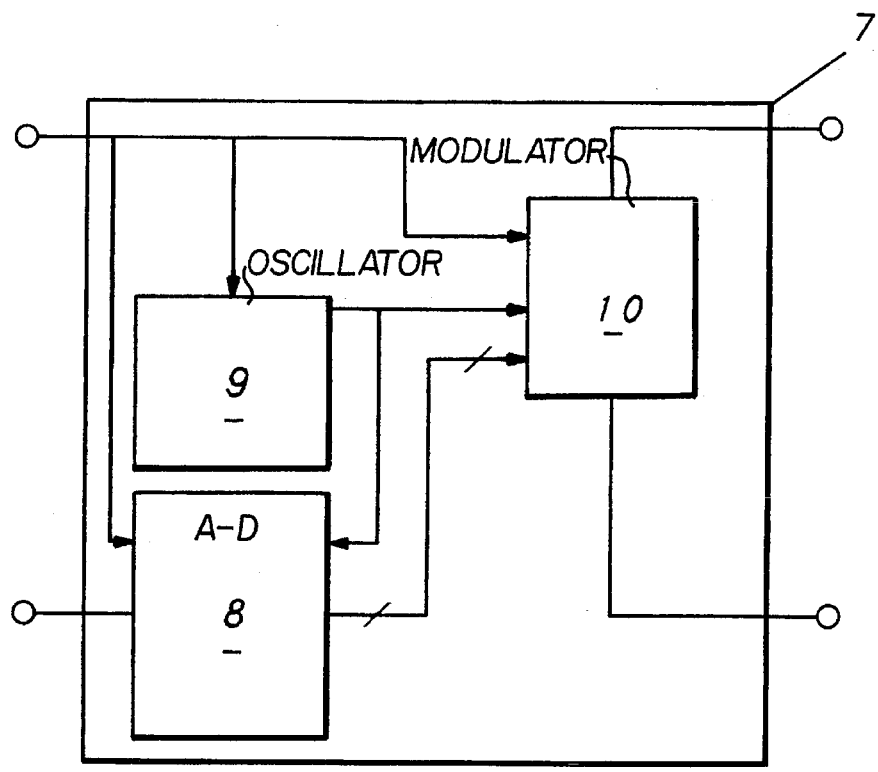
FIG. 4 shows a block diagram of the signal converter.

FIG. 4 shows a block diagram of the signal converter (7). The signal converter (7) essentially comprises an oscillator (9), an A/D converter (8) and a pulse-duration modulator (19). The auxiliary voltage is lowered in the voltage divider (R1, R2, C1) to a level which can be handled. The output of the voltage divider is connected to the input of the A/D converter (8). The A/D converter (8) is clocked by the oscillator (9). It converts the voltage which is present and which corresponds to the auxiliary voltage Uo into a digital signal, which is passed on via a plurality of lines to the pulse-duration modulator (10).

The pulse-duration modulator (10) converts the digital signal of the A/D converter into a pulse-duration-modulated pulse sequence, the duty cycle of which is a function of the value of the digital signal which is present. This pulse sequence is passed on to the output of the pulse-duration modulator (10).

In this way, when the switch is closed, the auxiliary voltage Uo is converted into a pulse-duration-modulated pulse sequence. Since only one voltage is present at the first means (3), in the event that the switch (1) is closed, it is thus possible to infer the switch position from the presence of a pulse-duration-modulated pulse sequence.

Figure 5:
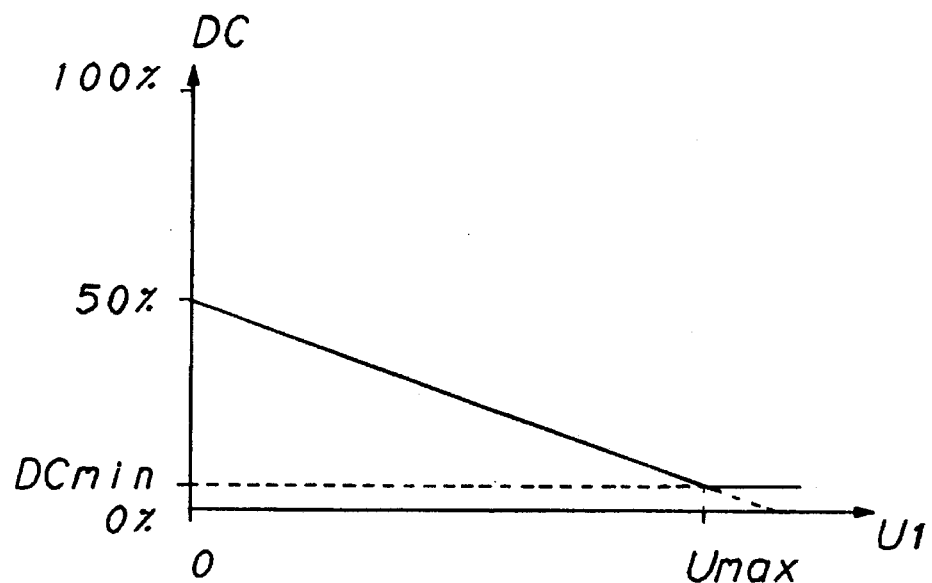
FIG. 5 shows the duty cycle of the pulse-duration-modulated signal as a function of the voltage Uo.

FIG. 5 shows a preferred encoding specification for the pulse-duration modulator (10). With quite small voltage values (in theory, approaching 0 V), the pulse sequence exhibits a duty cycle of 50%. Up to a determined maximum voltage (Umax), the duty cycle is reduced linearly as the voltage increases. With effect from the limiting voltage (Umax), the duty cycle is kept constant at the minimum value (DCmin>0%). As a result of this, it becomes possible to distinguish between 0 V, i.e. no voltage at the signal converter and thus no signal, and maximum voltage, i.e. a signal with 0% duty cycle and thus also no signal. Of course, none-linear encoding specifications are however also feasible. Moreover, the encoding can be cancelled in the evaluating means, and thus it is possible to infer the magnitude of the auxiliary voltage.

In a preferred embodiment, the signal converter (7) is integrated in an ASIC. As a result of this it is possible to save a large amount of space, and to increase the reliability of the signal converter (7).

Figure 3:
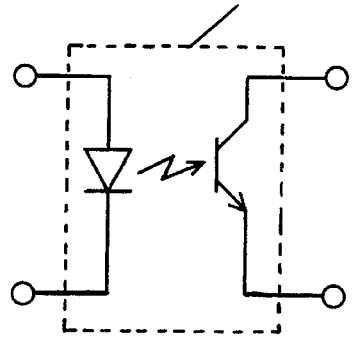
FIG. 3 shows an embodiment of the second means.

The second means (4) are now driven by this pulse sequence. As shown by FIG. 3, these means (4) preferably comprise an optocoupler (OC). The pulsed current of the light-emitting diode of the optocoupler (OC) thus exhibits a duty cycle which decreases as the auxiliary voltage increases. Accordingly, the monitoring device can be used for any selectable auxiliary voltage sources (2).

The third means (5) for the evaluation of the transmitted information are connected at the secondary side of the optocoupler (OC). These means (5) may comprise for example a microcomputer.

The optocoupler (OC) does of course load the power supply of the signal converter (7). The reference voltage of the A/D converter is thus adjusted. In order that it should be possible for the measurement in the A/D converter nevertheless to take place with the greatest possible accuracy, the latter is controlled so that it always converts the existing voltage when the optocoupler is not driven, in other words during the unused half of the duty cycle of the pulse sequence. In addition, the rise time of the optocoupler can also be displaced into this range. Accordingly, it is possible to use slow, i.e. cheap, optocouplers.

In order that it should be possible for the instant of closing of the switch (1) to be measured with the greatest possible accuracy, the pulse-duration modulator (10) preferably drives the optocoupler in such a manner that the optocoupler is energized immediately after closing of the switch. Otherwise, there would be a short delay time.

The process according to the invention comprises a first step in which the auxiliary voltage Uo, which is connected to the switch (1), is converted into a digital signal. The digital signal is transformed, in a second step, into a pulse-duration-modulated pulse sequence, the duty cycle of which decreases as the auxiliary voltage increases.

The specification for the conversion into a pulse-duration-modulated pulse sequence corresponds in this case to the above-explained encoding.

Accordingly, seen as a whole, with the invention a switch monitoring device is available, which can be used for differing auxiliary voltages without adaptation. Thus, the production of such devices can be standardized in a simple manner. In addition, not only the binary information on the switch position, but also the magnitude of the auxiliary voltage, is detected and transmitted.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A device for monitoring a switch position of a switch, the switch being part of a switch system, said device comprising:

an auxiliary voltage source, which is connected to the switch and emits a determined voltage Uo when the switch is closed, whereby different switch systems can have different values of the voltage Uo;

first means for detecting the switch position by detecting the presence of voltage Uo and for converting the detected voltage Uo into an electrical signal, the first means being connected to the switch and the auxiliary voltage source, in such a manner that, when the switch is closed, the voltage Uo is present at the first means;

second means for transmitting the electrical signal, whereby said second means are connected to the first means, the first and second means being supplied with electrical energy by the auxiliary voltage source; and third means for evaluating the electrical signal transmitted by the second means; wherein when the switch is kept closed, the first means converts the voltage Uo into a pulse-duration-modulated pulse sequence having a duty cycle depending on the value of the voltage Uo, whereby the duty cycle decreases as the value of the voltage Uo increases.

2. The device as claimed in claim 1, wherein the first means comprise an adaptation network and a signal converter.

3. The device as claimed in claim 2, wherein the adaptation network comprises:

a voltage limiter, a diode and a voltage divider with an input and an output which reduces the voltage Uo to a value U1, a voltage regulator comprising a current source, a Zener diode and smoothing capacitors and an adaptation resistor, whereby said voltage regulator emits a regulated voltage U2;

the voltage limiter being connected to the auxiliary voltage source, and the voltage regulator being connected via the diode to the voltage limiter;

the signal converter is powered by the voltage regulator and in addition is connected to the output of the voltage divider.

4. The device as claimed in claim 3, wherein the signal converter comprises:

an A/D converter with an analogue input and a digital output, the analogue input of which is connected to the output of the voltage divider whereby the A/D converter converts the voltage U1 present at the analogue input into a digital signal and passes said digital signal to the digital output;

a pulse-duration modulator with an input and an output, the input of which is connected to the digital output of the A/D converter and periodically converts the digital output signal of the A/D converter into a pulse-duration-modulated pulse sequence and passes said pulse sequence to the output of the pulse-duration modulator; and an oscillator, which emits a clock signal, by which the A/D converter and the pulse-duration modulator are clocked.

5. The device as claimed in claim 2, wherein the signal converter is integrated in an ASIC.

6. The device as claimed in claim 3, wherein the signal converter is integrated in an ASIC.

7. The device as claimed in claim 4, wherein the signal converter is integrated in an ASIC.

8. The device as claimed in claim 2, wherein the second means comprise an optocoupler, which is powered by the voltage regulator and is driven by the pulse-duration-modulated pulse sequence of the pulse-duration modulator.

9. The device as claimed in claim 3, wherein the second means comprise an optocoupler, which is powered by the voltage regulator and is driven by the pulse-duration-modulated pulse sequence of the pulse-duration modulator.

10. The device as claimed in claim 4, wherein the second means comprise an optocoupler, which is powered by the voltage regulator and is driven by the pulse-duration-modulated pulse sequence of the pulse-duration modulator.

11. The device as claimed in claim 5, wherein the second means comprise an optocoupler, which is powered by the voltage regulator and is driven by the pulse-duration-modulated pulse sequence of the pulse-duration modulator.

12. The device as claimed in claim 6, wherein the second means comprise an optocoupler, which is powered by the voltage regulator and is driven by the pulse-duration-modulated pulse sequence of the pulse-duration modulator.

13. The device as claimed in claim 7, wherein the second means comprise an optocoupler, which is powered by the voltage regulator and is driven by the pulse-duration-modulated pulse sequence of the pulse-duration modulator.

14. The device as claimed in claim 8, wherein the pulse-duration modulator drives the optocoupler in such a manner that the optocoupler is energized immediately after closing of the switch.

15. The device as claimed in claim 9, wherein the pulse-duration modulator drives the optocoupler in such a manner that the optocoupler is energized immediately after closing of the switch.

16. The device as claimed in claim 10, wherein the pulse-duration modulator drives the optocoupler in such a manner that the optocoupler is energized immediately after closing of the switch.

17. The device as claimed in claim 1, wherein the duty cycle of the pulse-duration-modulated pulse sequence decreases linearly as the value of the auxiliary voltage Uo increases.

18. A process for monitoring a position of a switch, comprising the steps of:

connecting the switch to an auxiliary voltage source, whereby said auxiliary voltage source emits a determined voltage Uo;

periodically converting the voltage Uo into a digital signal when the switch is kept closed, and subsequently converting the digital signal into a pulse-duration-modulated signal, and whereby a duty cycle of the pulse-duration-modulated signal decreases as the value of the voltage Uo increases.

19. The process as claimed in claim 18, further comprising the steps of limiting the duty cycle of the pulse-duration-modulated signal to a minimum value for an upper limit of the voltage Uo; and for Uo=0 V, limiting the duty cycle to 50% and decreasing the duty cycle linearly between 50% and a minimum value.

20. The device as claimed in claim 11, wherein the pulse-duration modulator drives the optocoupler in such a manner that the optocoupler is energized immediately after closing of the switch.

21. The device as claimed in claim 12, wherein the pulse-duration modulator drives the optocoupler in such a manner that the optocoupler is energized immediately after closing of the switch.

22. The device as claimed in claim 13, wherein the pulse-duration modulator drives the optocoupler in such a manner that the optocoupler is energized immediately after closing of the switch.

* * * * *